(12) United States Patent
Baccouche et al.

(10) Patent No.: US 10,266,081 B2
(45) Date of Patent: Apr. 23, 2019

(54) SEATING ASSEMBLY WITH LOAD-DISSIPATION

(71) Applicant: Ford Global Technologies, LLC, Dearborn, MI (US)

(72) Inventors: Ridha Baccouche, Ann Arbor, MI (US); Saeed Barbat, Novi, MI (US); Jamel E. Belwafa, Ann Arbor, MI (US); Rahul Arora, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 15/598,679

(22) Filed: May 18, 2017

(65) Prior Publication Data
US 2018/0334063 A1 Nov. 22, 2018

(51) Int. Cl.
*B60N 2/06* (2006.01)
*B60N 2/52* (2006.01)

(52) U.S. Cl.
CPC ............... *B60N 2/527* (2013.01); *B60N 2/06* (2013.01)

(58) Field of Classification Search
CPC .................................. B60N 2/527; B60N 2/06
USPC ............. 297/344.11, 344.1, 260.1, 329, 339, 297/344.13, 229; 248/429, 430
See application file for complete search history.

(56) References Cited

U.S. PATENT DOCUMENTS

| | | | |
|---|---|---|---|
| 1,711,085 A | 4/1929 | D'arcy | |
| 3,182,947 A * | 5/1965 | Akira | B60N 2/1803 248/396 |
| 5,593,206 A * | 1/1997 | Fukuoka | A47C 3/02 297/217.7 |
| 6,655,739 B2 * | 12/2003 | Furukawa | B60N 2/015 248/429 |
| 8,091,692 B2 | 1/2012 | Deshmukh et al. | |
| 8,752,897 B2 * | 6/2014 | Fischbein | B60N 2/1695 248/429 |

FOREIGN PATENT DOCUMENTS

CN 205220446 U 5/2016

\* cited by examiner

*Primary Examiner* — Syed A Islam
(74) *Attorney, Agent, or Firm* — Vichit Chea; Price Heneveld LLP

(57) ABSTRACT

A seating assembly includes a seat and one or more slide rails that slidably engage an underside of the seat and permit longitudinal movement of the seat along the slide rail. The seating assembly further includes one or more load-dissipating assemblies operably coupled to an underside of the slide rail.

17 Claims, 4 Drawing Sheets

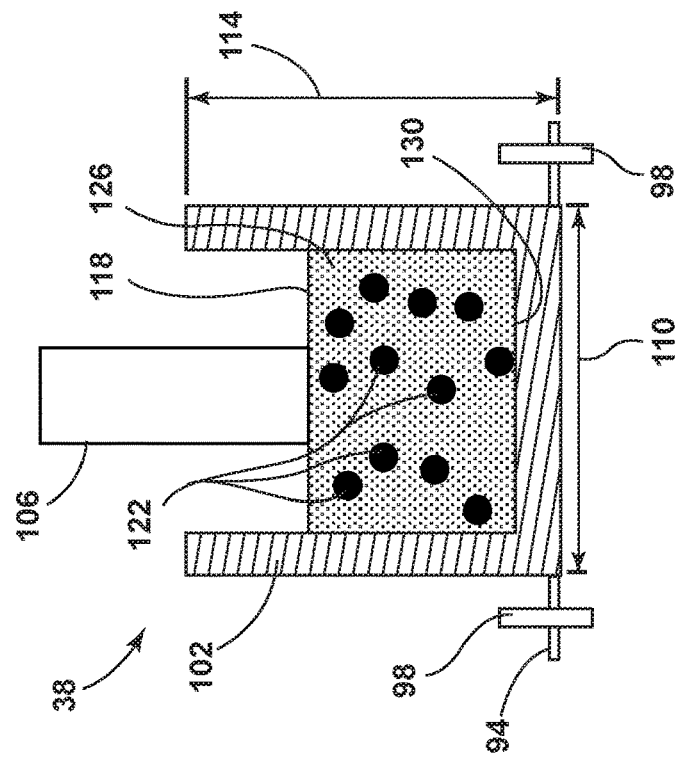
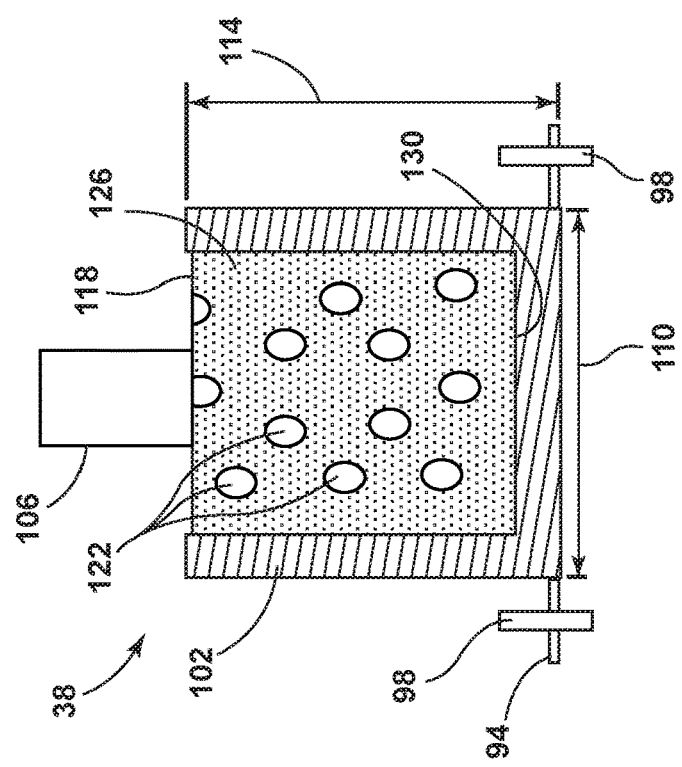

SEATING ASSEMBLY WITH LOAD-DISSIPATION

FIELD OF THE DISCLOSURE

The present disclosure generally relates to seating assemblies. More specifically, the present disclosure relates to a seating assembly with load-dissipation.

BACKGROUND OF THE INVENTION

Seating assemblies are used by occupants of various sizes and weights. Accordingly, the seating assembly may feel soft and comfortable to one occupant while another occupant experiences the seating assembly as stiff and uncomfortable. Traditional seating assemblies offer some user-adjustable comfort features to combat these variations. However, a need exists for additional features and approaches to providing a comfortable seating assembly for a variety of occupants.

SUMMARY OF THE INVENTION

According to a first aspect of the present disclosure, a seating assembly includes a seat and one or more slide rails that slidably engage an underside of the seat and permit longitudinal movement of the seat along the slide rail. The seating assembly further includes one or more load-dissipating assemblies operably coupled to an underside of the slide rail.

Embodiments of the first aspect of the present disclosure can include any one or a combination of the following features:
  the one or more load-dissipating assemblies engage with the one or more slide rails such that the seat is free to traverse an entire length of the one or more slide rails;
  the one or more load-dissipating assemblies include a first load-dissipating assembly and a second load-dissipating assembly;
  the first load-dissipating assembly is operably coupled to the slide rail at a first end and the second load-dissipating assembly is operably coupled to the slide rail at a second end;
  the one or more slide rails include a first slide rail operably coupled to a first side of the seating assembly and a second slide rail operably coupled to a second side of the seating assembly;
  the first load-dissipating assembly and the second load-dissipating assembly are both fluid nanofoam pistons; and
  the one or more load-dissipating assemblies have a width of at least about 30 mm and a height of at least about 60 mm.

According to a second aspect of the present disclosure, a seating assembly includes a seat and first and second slide rails that slidably engage an underside of the seat and permit longitudinal movement of the seat along the slide rail. The seating assembly further includes one or more load-dissipating assemblies operably coupled to an underside of the slide rails.

Embodiments of the second aspect of the present disclosure can include any one or a combination of the following features:
  the one or more load-dissipating assemblies include a first load-dissipating assembly, a second load-dissipating assembly, a third load-dissipating assembly, and a fourth load-dissipating assembly;
  the first load-dissipating assembly and the second load-dissipating assembly are operably coupled to a first end and a second end of the first slide rail, respectively;
  the third load-dissipating assembly and the fourth load-dissipating assembly are operably coupled to a forward end and a rearward end of the second slide rail, respectively;
  the first, second, third, and fourth load-dissipating assemblies are each fluid nanofoam pistons;
  the one or more load-dissipating assemblies have a width of at least about 30 mm and a height of at least about 60 mm; and
  the one or more load-dissipating assemblies are operably coupled to a support surface by one or more fasteners.

According to a third aspect of the present disclosure, a seating assembly includes a seat pivotably coupled to a seatback and first and second slide rails that slidably engage an underside of the seat. The seating assembly further includes one or more load-dissipating assemblies operably coupled to an underside of the slide rails that permit longitudinal movement of the seat along the slide rail. The load-dissipating assemblies are positioned at load-bearing points of the seating assembly.

Embodiments of the third aspect of the present disclosure can include any one or a combination of the following features:
  the one or more load-dissipating assemblies include a first load-dissipating assembly, a second load-dissipating assembly, a third load-dissipating assembly, and a fourth load-dissipating assembly;
  the first load-dissipating assembly and the second load-dissipating assembly are operably coupled to a first end and a second end of the first slide rail, respectively;
  the third load-dissipating assembly and the fourth load-dissipating assembly are operably coupled to a forward end and a rearward end of the second slide rail, respectively;
  the first, second, third, and fourth load-dissipating assemblies are each fluid nanofoam pistons; and
  the one or more load-dissipating assemblies are operably coupled to a support surface by one or more fasteners.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4 is a cross-sectional view of one of the load-dissipating assemblies taken at line IV-IV of FIG. 3 illustrating the load-dissipating assembly in a first position, according to one embodiment; and FIG. 5 is a cross-sectional view of one of the load-dissipating assemblies taken at line IV-IV of FIG. 3 illus-

DETAILED DESCRIPTION OF THE PREFERRED EMBODIMENTS

Figure 1:
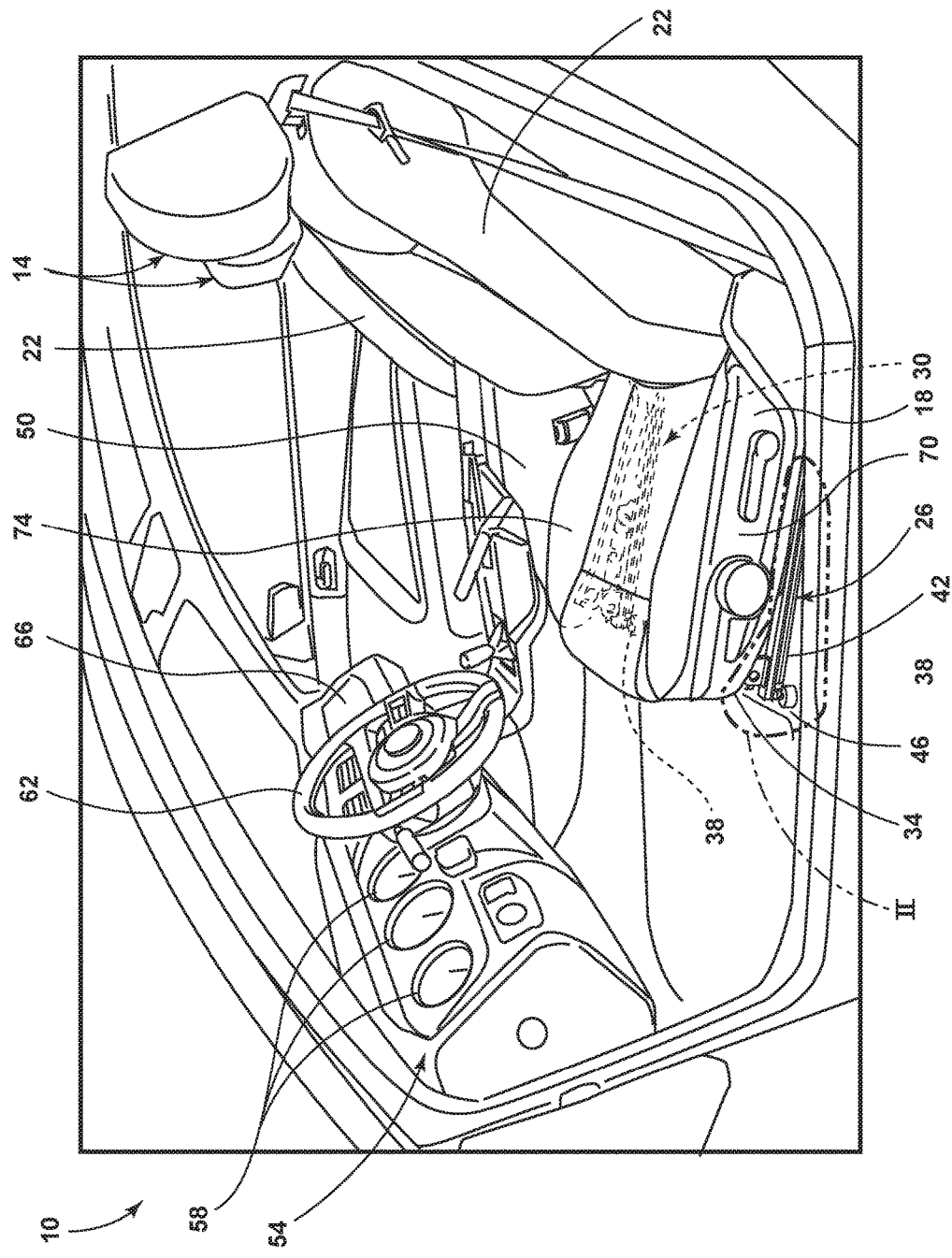
FIG. 1 is a side perspective view of an interior of a vehicle illustrating a seating assembly equipped with load-dissipating assemblies.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-5, a vehicle 10 includes one or more seating assemblies 14. The seating assemblies 14 include a seat 18 pivotably coupled to a seatback 22 and first and second slide rails 26, 30 that slidably engage an underside of the seat 34. The seating assemblies 14 further include one or more load-dissipating assemblies 38 operably coupled to an underside of the slide rails 42 that permit longitudinal movement of the seat 18 along the slide rails 26, 30. The load-dissipating assemblies 38 are positioned at load-bearing points 46 of the seating assemblies 14.

Referring again to FIG. 1, the seating assemblies 14 may be positioned as front row seating assemblies in the vehicle 10, which may be a wheeled motor vehicle as shown. While shown as a wheeled motor vehicle, it is contemplated that the concepts disclosed herein may be utilized on other vehicles, such as boats, planes, motorcycles, bicycles, and other forms of transportation that employ seating assemblies 14. The seating assemblies 14 are shown as separated by a center console 50. The seating assemblies 14 are positioned rearward of a dashboard 54 of the vehicle 10. The dashboard 54 typically includes an instrument panel 58, a steering wheel 62, and a glove box 66. The seating assembly 14 includes one or more slide rails, such as the first slide rail 26 and the second slide rail 30, which are both supported by an underlying support surface 94, such as the floor of the vehicle 10. The first slide rail 26 is operably coupled to a first side 70 of the seating assembly 14. The second slide rail 30 is operably coupled to a second side 74 of the seating assembly 14.

Figure 2:
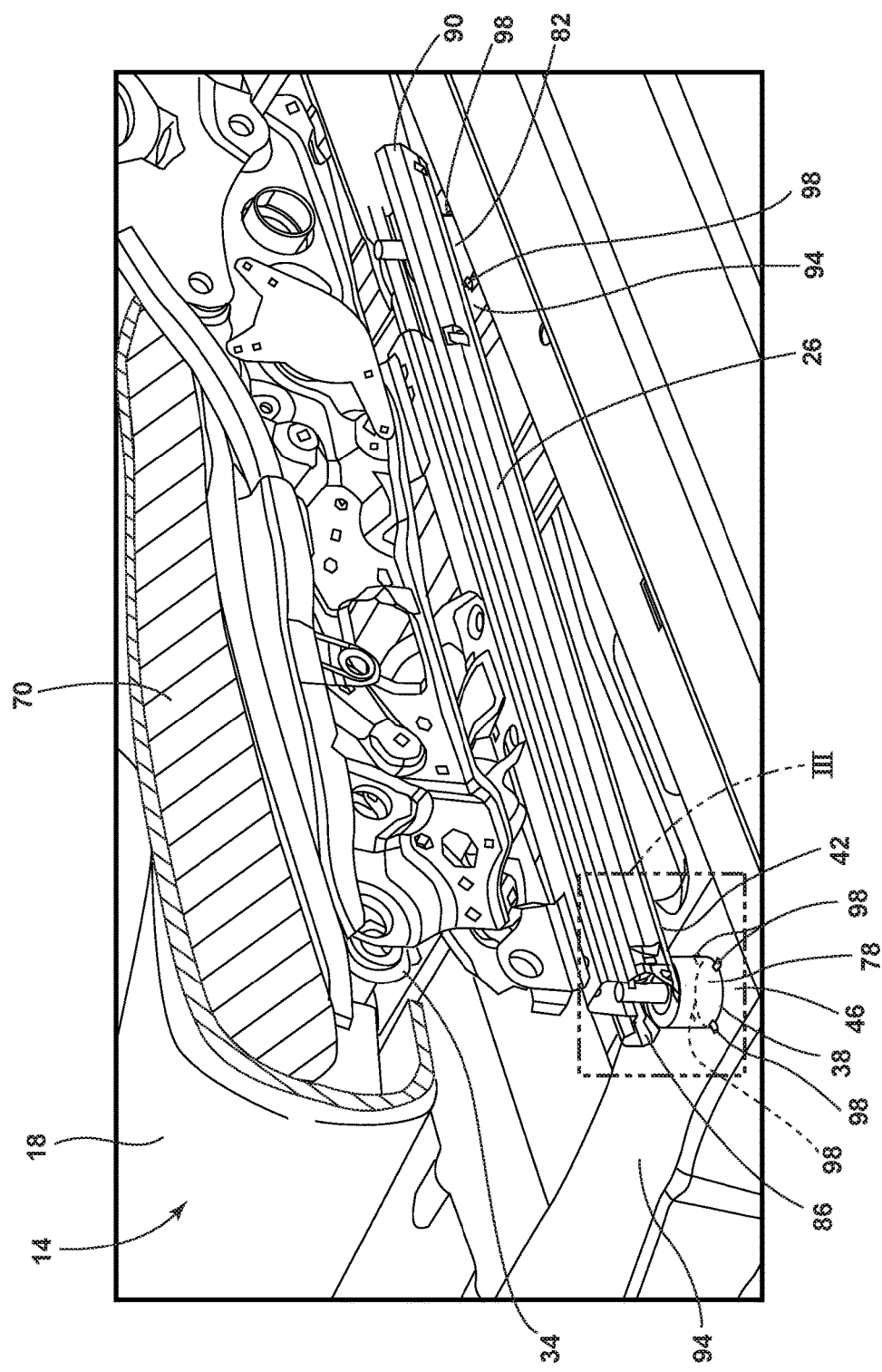
FIG. 2 is an expanded view of a slide rail of the seating assembly that is equipped with load-dissipating assemblies, taken at section II of FIG. 1, according to one embodiment.

Referring now to FIG. 2, the first side 70 of the seating assembly 14 is shown in a cross-sectional and expanded view. The load-dissipating assemblies 38 are shown as a first load-dissipating assembly 78 and a second load-dissipating assembly 82. The first load-dissipating assembly 78 is operably coupled to a first end 86 of the first slide rail 26. The second load-dissipating assembly 82 is operably coupled to a second end 90 of the first slide rail 26. The second slide rail 30 may be a mirror image of the first slide rail 26. Accordingly, the second slide rail 30 may include a third load-dissipating assembly positioned at a forward end of the second slide rail 30 and a fourth load-dissipating assembly positioned at a rearward end of the second slide rail 30. While the seating assembly 14 is illustrated with the first load-dissipating assembly 78 and the second load-dissipating assembly 82 positioned at the first end 86 and the second end 90, respectively, it is contemplated that load-dissipating assemblies 38 may be alternatively positioned on the seating assembly 14 without departing from the concepts disclosed herein. It may be beneficial for the load-dissipating assemblies 38 to be positioned at the load-bearing points 46 of the seating assembly 14. Additionally, while the first slide rail 26 and the second slide rail 30 have been illustrated as positioned on the first side 70 and the second side 74 of the seating assembly 14, respectively, it is contemplated that the slide rails 26, 30 may be alternatively positioned. Further, it is contemplated that a single slide rail may be used with the seating assembly 14 and positioned, for example, along a central axis of the seating assembly 14. Alternatively, the first and second slide rails 26, 30 may be accompanied by additional support rails that may be similar to the first and second slide rails 26, 30 and oriented parallel or perpendicular to the slide rails 26, 30 depicted.

Figure 3:
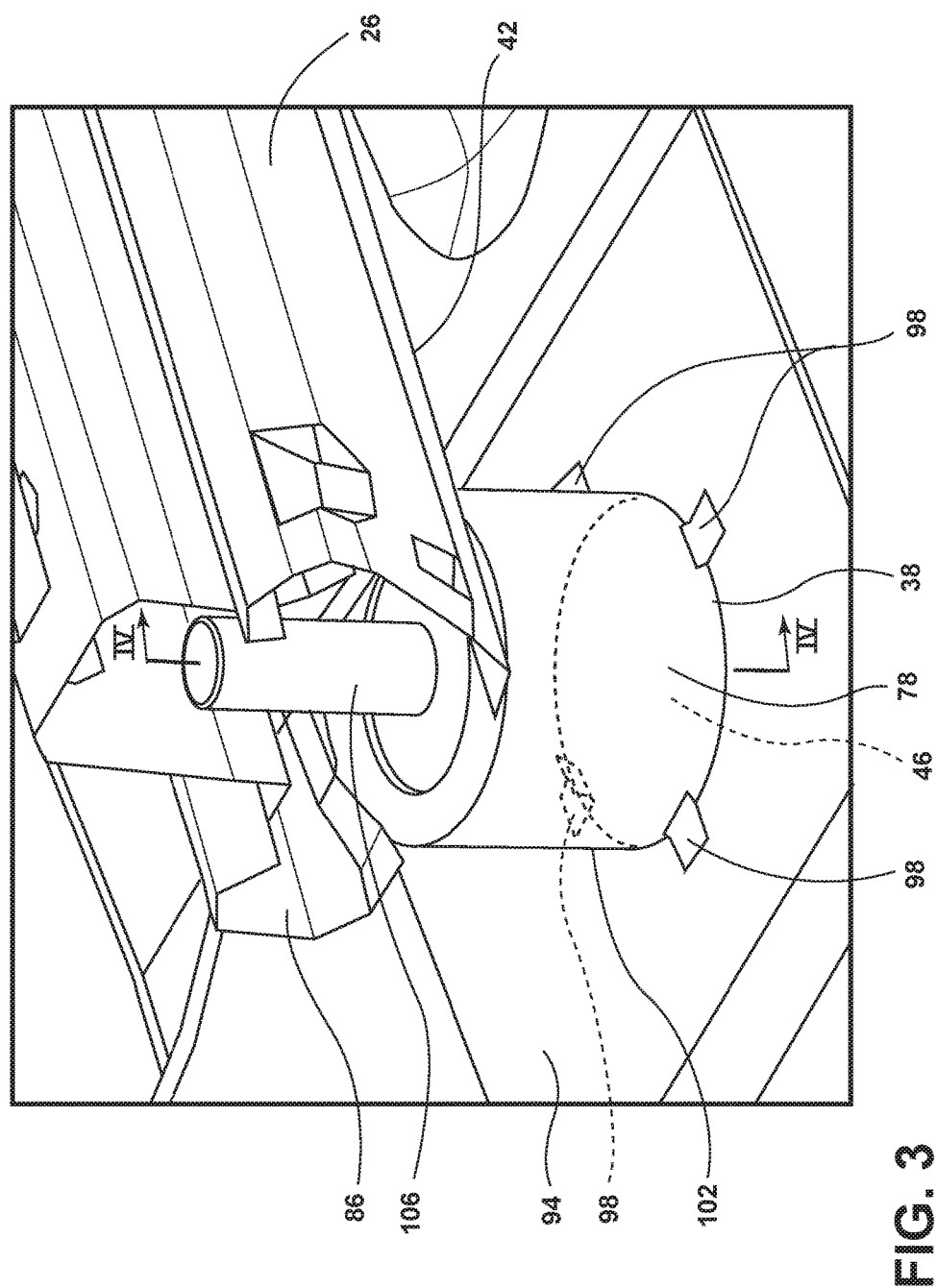
FIG. 3 is an expanded view of one of the load-dissipating assemblies taken at section III of FIG. 2, according to one embodiment.

Referring to FIG. 3, the operable coupling between the first slide rail 26 and the first load-dissipating assembly 78 is shown in further detail. The first load-dissipating assembly 78 is operably coupled to a support surface 94 by one or more fasteners 98. The support surface 94 may be a floor of the vehicle 10. The first load-dissipating assembly 78 may include a cylinder portion 102 and a piston portion 106. The cylinder portion 102 is secured to the support surface 94 by the fasteners 98. The piston portion 106 travels in a vertical direction within the cylinder portion 102 in response to load-impact events. Accordingly, the piston portion 106 of the load-dissipating assembly 38 may be directly coupled to the first slide rail 26 such that load-impact events that cause a change in the load (e.g., a shock) are transmitted from the seating assembly 14 to the load-dissipating assembly 38 where the load changes are dampened to provide a level of compliance or "give" to the seating assembly 14 and increase the comfort of an occupant. Additionally, load-impact events imparted on the cylinder portion 102 of the load-dissipating assembly 38 are dampened as they are transmitted from the cylinder portion 102 to the piston portion 106 and ultimately to the seating assembly 14, thereby further improving the comfort of the occupant in the seating assembly 14. The load-impact events may include, but are not limited to, the vehicle 10 experiencing adverse road conditions, potholes, speed bumps, road debris, and various situations that result in a sudden movement of the vehicle 10 in the plane of travel of the piston portion 106 (e.g., a vertical direction). While the plane of travel of the piston portion 106 is shown as being in a substantially vertical direction, it is contemplated that the load-dissipating assembly 38 may be employed in various orientations that result in the plane of travel of the piston portion 106 being in a direction other than the vertical direction (e.g., angle displaced from vertical, horizontal, and/or an angle displaced from horizontal) without departing from the concepts disclosed herein. The load-impact events may additionally include, but are not limited to, an occupant of the seating assembly 14 sitting on the seating assembly 14, shifting their weight for comfort, and shifting their weight in response to maneuvers of the vehicle 10 (e.g., cornering, braking, accelerating, etc.).

Referring again to FIG. 3, an advantage of the present disclosure lies in the interaction between the load-dissipating assembly 38 and the first slide rail 26. More specifically, the load-dissipating assembly 38 nests within the underside of the slide rail 42 such that longitudinal movement of the seat 18 along the slide rail 26 is permitted while maintaining the advantages of the load-dissipating assemblies 38. In other words, the increased comfort and ride smoothness offered by the load-dissipating assemblies 38 does not interfere with common features provided with the seating assembly 14, such as the ability to adjust a longitudinal position of the seating assembly 14 within the vehicle 10 to accommodate occupants of varying heights.

Referring now to FIGS. 4 and 5, the load-dissipating assemblies 38 may have a width 110 of at least about 20 mm, at least about 30 mm, at least about 40 mm, at least about 50 mm, or at least about 60 mm. The load-dissipating assemblies 38 may have a height 114 of at least about 40 mm, at least about 50 mm, at least about 60 mm, at least about 70 mm, at least about 80 mm, at least about 90 mm, or at least about 100 mm. The load-dissipating assemblies 38 are shown operably coupled to the support surface 94 by the one or more fasteners 98. The load-dissipating assemblies 38 are operable between an extended position (FIG. 4) and a compressed position (FIG. 5). As the load-dissipating assemblies 38 are actuated between the extended position and the compressed position, the piston portion 106 travels within the cylinder portion 102 between an upper end of the cylinder portion 102 and a lower end of the cylinder portion 102.

Referring again to FIGS. 4 and 5, the load-dissipating assemblies 38 may be fluid nanofoam pistons. The fluid nanofoam pistons may include a particle portion 118 that has nanoparticles 122 and a fluid portion 126. The particle portion 118 may have any geometric cross-section, such as a circular cross-section, a rectangular cross-section, or a triangular cross-section, without departing from the concepts disclosed herein. The fluid of the fluid portion 126 may be a liquid. In embodiments that employ fluid nanofoam pistons as the load-dissipating assemblies 38, the nanoparticles 122 of the particle portion 118 may have a diameter that is in the range of about 0.1 nm to about 1,000 nm, about 1 nm to about 100 nm, about 10 nm to about 100 nm, or combination thereof. Additionally, the nanoparticles 122 may have various diameters within the particle portion 118. Alternatively, the nanoparticles 122 may have uniform diameters within the particle portion 118. In some embodiments, when the load-dissipating assembly 38 is in the extended position the fluid of the fluid portion 126 is co-localized with the particle portion 118 but generally excluded from the nanoparticles 122. Said another way, the nanoparticles 122 may be generally free of the fluid of the fluid portion 126 when the load-dissipating assembly 38 is in the extended position. In one embodiment, when the load-dissipating assembly 38 transitions from the extended position to the compressed position, the fluid of the fluid portion 126 is at least partially transitioned from being co-localized with the particle portion 118 to being co-localized with the nanoparticles 122. Said another way, as the fluid nanofoam piston compresses, the fluid from the fluid portion 126 is at least partially forced out of the particle portion 118 and into the nanoparticles 122. In so doing, the piston portion 106 is able to travel vertically downward into the cylinder portion 102 and compress the particle portion 118 and the fluid portion 126. According to one embodiment, the particle portion 118 is sufficiently resilient to provide a restorative or biasing force that counter-acts the compression force supplied by the piston portion 106 in response to a load-impact event, such as when the load changes due to shock, deceleration, acceleration, or other load events. The particle portion 118 has a spring constant sufficient to bias the piston portion 106 to the extended position while providing adequate compliance or "give" to improve the comfort of the occupant in the seating assembly 14. In alternative embodiments, a biasing member, such as a coil spring, may be provided to supply a restorative or biasing force that favors the extended position of the load-dissipating assembly 38. In such an embodiment, the biasing member may be positioned between the piston portion 106 and a bottom wall 130 of the load-dissipating assembly 38. Alternatively, the biasing member may ensheath an outer diameter of the load-dissipating assembly 38 and engage with the seating assembly 14 (e.g., the first or second slide rail 26, 30) at a first end and engage with the support surface 94 or an upper end of the cylinder portion 102 at a second end.

Referring further to FIGS. 4 and 5, the particle portion 118 and/or the fluid portion 126 of the load-dissipating assemblies 38 may include a non-Newtonian fluid (e.g., a dilatant fluid). Non-Newtonian fluids exhibit a non-linear relationship between rates of shear strain and shear stress. The particle portion 118 and/or the fluid portion 126 of the load-dissipating assemblies 38 may provide the restoring or biasing force through shear thickening that is provided by the non-Newtonian fluid. Shear thickening occurs in non-Newtonian fluids when the viscosity of a fluid increases with the rate of shear strain. Accordingly, the non-Newtonian fluid may act more solid-like in response to rapid external forces, for example, when shear strain is high (e.g., load-impact events). In contrast, when shear strain is low the non-Newtonian fluid may act more liquid-like and flow more freely (e.g., occupant shifting weight in the seating assembly 14).

The seating assembly 14 disclosed herein provides improved comfort to an occupant of the seating assembly 14. The improved comfort to the occupant is accomplished, at least in part, by the load-dissipating assemblies 38. The load-dissipating assemblies 38 are configured to absorb, decrease, and/or dissipate load-impact events that occur during normal operation of the vehicle 10. Accordingly, the ride comfort for a variety of occupants of the seating assembly 14 is improved.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A seating assembly comprising:
   a seat;
   one or more slide rails that slidably engage an underside of the seat and permit longitudinal movement of the seat along the slide rail; and
   one or more load-dissipating assemblies operably coupled to an underside of the slide rail, wherein the one or more load-dissipating assemblies are each fluid nanofoam pistons.

2. The seating assembly of claim 1, wherein the one or more load-dissipating assemblies engage with the one or more slide rails such that the seat is free to traverse an entire length of the one or more slide rails.

3. The seating assembly of claim 2, wherein the one or more load-dissipating assemblies comprise a first load-dissipating assembly and a second load-dissipating assembly.

4. The seating assembly of claim 3, wherein the first load-dissipating assembly is operably coupled to the slide rail at a first end and the second load-dissipating assembly is operably coupled to the slide rail at a second end.

5. The seating assembly of claim 4, wherein the one or more slide rails comprise a first slide rail operably coupled to a first side of the seating assembly and a second slide rail operably coupled to a second side of the seating assembly.

6. The seating assembly of claim 1, wherein the one or more load-dissipating assemblies have a width of at least about 30 mm and a height of at least about 60 mm.

7. A seating assembly comprising:
   a seat;
   first and second slide rails that slidably engage an underside of the seat; and
   one or more load-dissipating assemblies operably coupled to an underside of the slide rails that permit longitudinal movement of the seat along the slide rail, wherein each of the one or more load-dissipating assemblies is a fluid nanofoam pistons.

8. The seating assembly of claim 7, wherein the one or more load-dissipating assemblies comprise a first load-dissipating assembly, a second load-dissipating assembly, a third load-dissipating assembly, and a fourth load-dissipating assembly.

9. The seating assembly of claim 8, wherein the first load-dissipating assembly and the second load-dissipating assembly are operably coupled to a first end and a second end of the first slide rail, respectively.

10. The seating assembly of claim 9, wherein the third load-dissipating assembly and the fourth load-dissipating assembly are operably coupled to a forward end and a rearward end of the second slide rail, respectively.

11. The seating assembly of claim 7, wherein the one or more load-dissipating assemblies have a width of at least about 30 mm and a height of at least about 60 mm.

12. The seating assembly of claim 7, wherein the one or more load-dissipating assemblies are operably coupled to a support surface by one or more fasteners.

13. A seating assembly comprising:
   a seat pivotably coupled to a seatback;
   first and second slide rails that slidably engage an underside of the seat; and
   one or more load-dissipating assemblies operably coupled to an underside of the slide rails that permit longitudinal movement of the seat along the slide rail, wherein the load-dissipating assemblies are positioned at load-bearing points of the seating assembly, and wherein the one or more load-dissipating assemblies are fluid nanofoam pistons.

14. The seating assembly of claim 13, wherein the one or more load-dissipating assemblies comprise a first load-dissipating assembly, a second load-dissipating assembly, a third load-dissipating assembly, and a fourth load-dissipating assembly.

15. The seating assembly of claim 14, wherein the first load-dissipating assembly and the second load-dissipating assembly are operably coupled to a first end and a second end of the first slide rail, respectively.

16. The seating assembly of claim 15, wherein the third load-dissipating assembly and the fourth load-dissipating assembly are operably coupled to a forward end and a rearward end of the second slide rail, respectively.

17. The seating assembly of claim 13, wherein the one or more load-dissipating assemblies are operably coupled to a support surface by one or more fasteners.

* * * * *